Feb. 20, 1923.

H. GRADE

GEAR ARRANGEMENT FOR MOTOR VEHICLES

Filed Mar. 9, 1922

1,446,175

Inventor
H. Grade

By Marks & Clerk

Attorneys

Patented Feb. 20, 1923.

1,446,175

UNITED STATES PATENT OFFICE.

HANS GRADE, OF BORK, GERMANY.

GEAR ARRANGEMENT FOR MOTOR VEHICLES.

Application filed March 9, 1922. Serial No. 542,503.

*To all whom it may concern:*

Be it known that I, HANS GRADE, a subject of the German Republic, and residing at Bork i/Mark, Germany, have invented a certain new and useful Gear Arrangement for Motor Vehicles (for which I have filed applications in Germany Sept. 17th, 1919, Oct. 8th, 1919, and March 27th, 1920), of which the following is a full, clear, and exact description.

The invention relates to frictional power transmitting gear particularly designed for motor vehicles and has for its object to provide improved means for effecting adjustment of the driven friction disc relative to the driving disc.

The invention is shown in one form of embodiment in the drawings where—

Figure 1:
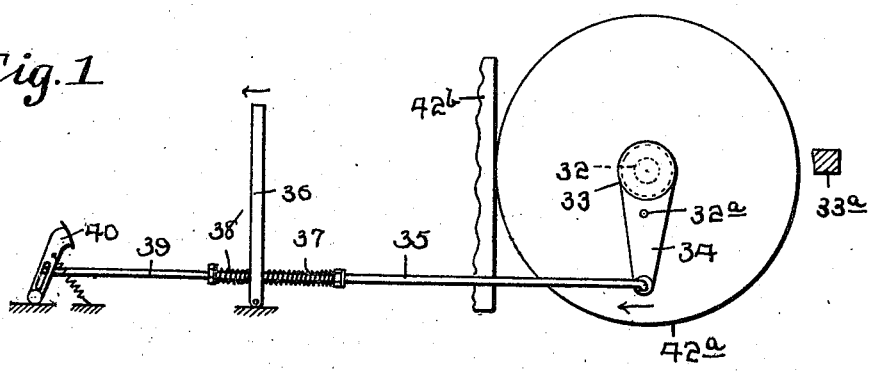
Fig. 1 is a side elevation of the frictional power transmitting gear showing the adjusting means therefor.
Figure 2:
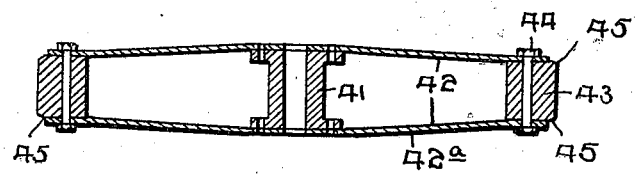
Fig. 2 is a section through the friction disc.

Referring to the drawing in detail, the numeral 32 indicates the supporting shaft for the driven friction disk $42^a$ which is journalled in the bearing bracket 33. This bearing bracket 33 is mounted to swing about a pivot $32^a$, and carries an extension 34 which is connected with the tie rod 35. The latter passes through an eye in a lever 36 and is yieldably held against movement in the longitudinal direction by two springs 37 and 38. The tie rod 35 is furthermore coupled by a connecting rod 39 with the pedal 40. The lever 36 can be moved backwards and forwards. If it is pressed backwardly the spring 37 is tensioned and presses through the tie rod 35 and the lever 34 the bearing bracket 33 and thereby the shaft 32 with the friction disc $42^a$ is moved against the operating disc $42^b$. If the friction disc $42^a$ is moved away from the operating disc $42^b$ by pressure exerted on the pedal 40, in order to return it to engaging position, the lever 40 is moved rearwardly. If the pedal is pressed further forwards the friction disc, similar as in the case of the control lever 36, can be pressed against a braking device $33^a$. This braking device is placed opposite to the operating disc. The pressure device allows a momentary disconnection of the friction disc by pedal, by the employment of relatively weak pressure springs, according to the length of the lever 34, corresponding to the customary style of construction of coupling pedals. The spring 38 avoids unresilient pressure of the friction wheel against the braking device $33^a$ by moving the lever 36 forwards.

The friction disc $48^a$ consists of two discs 42 fixed with screws on the hub 41 and between which the ring 43 is secured by bolts at very little distance from the outer edge of the plate disc. The ring 43 protrudes a distance beyond the discs 42 and is turned and ground on the outside and rounded off on the edges 45. The discs 42 are of conical form and are drawn together by the screws 44. The ring 43 consists of woodstone and is wholly cast and compressed, i. e., without joints. The use of woodstone gives a high frictional coefficiency, therefore with negligible pressure a good driving effect of the gear is obtained.

I claim as my invention:—

In a frictional power transmission gear, a driven friction disc, a driving disc, a pivoted bearing bracket for the driven disc arranged to move the latter into and out of engagement with the driving disc, a tie rod connected with said bracket, a pivotally mounted control lever associated with said tie rod, opposed spring elements connecting the tie rod with the lever and permitting limited movement of the latter under tension relative to the tie rod, and a pivoted pedal connected with said tie rod and movable independently of said lever for shifting the tie rod to such position as to disengage the driven disc from the driving disc.

In testimony whereof I have affixed my signature in the presence of two witnesses.

HANS GRADE.

Witnesses:
RICHARD GRINBER,
LUITS BUDRE.